United States Patent
Dessoly

(10) Patent No.: US 7,371,037 B2
(45) Date of Patent: May 13, 2008

(54) ROTARY CUTTING TOOL COMPRISING TWO CUTTING PORTIONS HAVING OPPOSED CUTTING DIRECTIONS

(75) Inventor: Vincent Dessoly, Juvisy (FR)

(73) Assignee: SNECMA, Paris (FR)

(*) Notice: Subject to any disclaimer, the term of this patent is extended or adjusted under 35 U.S.C. 154(b) by 0 days.

(21) Appl. No.: 11/677,888

(22) Filed: Feb. 22, 2007

(65) Prior Publication Data

US 2007/0196191 A1    Aug. 23, 2007

(30) Foreign Application Priority Data

Feb. 23, 2006   (FR) .................................. 06 01587

(51) Int. Cl.
B23C 5/16   (2006.01)
(52) U.S. Cl. ...................... 409/234; 409/138; 409/140; 409/217; 407/31; 407/55
(58) Field of Classification Search ................ 409/234, 409/232, 180, 192, 203, 213, 217, 138, 139, 409/140; 408/230, 224; 407/31, 53, 54, 407/55, 56, 57, 58, 59, 60, 61; 144/218, 144/236, 237
See application file for complete search history.

(56) References Cited

U.S. PATENT DOCUMENTS

| | | | |
|---|---|---|---|
| 1,343,276 A * | 6/1920 | Olson et al. .................. 407/26 |
| 1,713,273 A * | 5/1929 | Farrington .................... 407/31 |
| 1,898,732 A * | 2/1933 | Krohne ......................... 407/31 |
| 2,298,471 A * | 10/1942 | Drumond ...................... 407/27 |
| 3,946,777 A * | 3/1976 | Heimbrand ................. 144/91.2 |
| 4,806,050 A * | 2/1989 | Bryant ..................... 408/203.5 |
| 5,173,013 A * | 12/1992 | Gorse et al. .................. 408/22 |
| 5,433,563 A * | 7/1995 | Velepec ....................... 409/234 |
| 5,662,435 A * | 9/1997 | Sherman ....................... 407/31 |
| 6,899,494 B2 * | 5/2005 | Walrath ......................... 407/54 |
| 7,150,589 B2 * | 12/2006 | Nordlin ....................... 409/138 |
| 2004/0258490 A1 | 12/2004 | Walrath |

FOREIGN PATENT DOCUMENTS

DE        103 18 948 A1       8/2004

* cited by examiner

Primary Examiner—Dana Ross
(74) Attorney, Agent, or Firm—Oblon, Spivak, McClelland, Maier & Neustadt, P.C.

(57) ABSTRACT

A rotary cutting tool extending along a longitudinal axis and including a first cutting portion including a plurality of first helical teeth having a helix direction and being designed to work in a first direction of rotation of the tool. The tool also includes a second cutting portion with a plurality of second helical teeth having, as helix direction, the same helix direction as the first cutting portion and being designed to work in a second direction of rotation of the tool, opposed to the first.

11 Claims, 2 Drawing Sheets

ROTARY CUTTING TOOL COMPRISING TWO CUTTING PORTIONS HAVING OPPOSED CUTTING DIRECTIONS

BACKGROUND OF THE INVENTION AND DESCRIPTION OF THE PRIOR ART

The present invention generally relates to the field of rotary cutting tools such as milling tools, also known as milling cutters.

The invention also concerns the field of machining methods using such tools, in particular but not exclusively machining methods employed in the area of aeronautical constructions. By way of indication, the methods in question may in particular be methods for producing parts of engines intended to equip aircraft.

In the prior art, the machining methods aimed at obtaining such parts of complex geometry often require the use of a multitude of successive machining steps, and more specifically of a number of milling steps during which the tool used is moved with a circular cutting movement about its own longitudinal axis, and the workpiece to be machined is moved with any desired relative feed movement with respect to this tool.

In order to best optimize this type of method, it is known to a person skilled in the art to prefer a machining operation in "climb mode" rather than in "conventional mode", these two modes being defined not only as a function of the direction of rotation of the tool, itself governed exclusively by the orientation of the helical cutting teeth equipping this tool, but also as a function of the direction of the relative feed between this cutting tool and the workpiece to be machined.

In light of the foregoing, it is clear that during the use of the method for machining a workpiece, when the direction of relative feed between the cutting tool and the workpiece is imposed by the workpiece geometry, the fact of wishing to work with preference in the climb mode imposes a direction of rotation of the tool. That may therefore result in the need to employ a different tool from the one used in the preceding machining step whenever this previously used tool was designed to rotate in the direction of rotation opposed to the new direction of rotation required.

This constraint of changing tools during the machining of one and the same workpiece is clearly extremely penalizing in terms of production times and costs, this disadvantage being of course all the more constraining when the number of separate machining steps to be carried out is high.

Moreover, when the direction of relative feed between the cutting tool and the workpiece is not imposed and can thus be freely chosen by the operator as a function of the direction of rotation of the tool and so as to allow working in climb mode, it may nevertheless occur that the overall cutting force generated during this machining step does not result in the workpiece being applied against the positioning rests conventionally provided on the machine but, on the contrary, in this same workpiece being applied against clamping means which equip the machine and complement the positioning rests.

This latter configuration is clearly not desired in the sense that it does not allow good positioning of the workpiece to be maintained during the machining, this disadvantage being manifested by losses in terms of cutting quality and precision.

Consequently, to allow working in climb mode and moreover generate an overall cutting force resulting in the workpiece being applied against the positioning rests and not against the clamping means, it would probably be required in this case too to have recourse to a change of tool in favour of a tool having an opposed direction of rotation. Nevertheless, that would involve being exposed to the aforementioned disadvantages relating to the tool-changing operations.

SUMMARY OF THE INVENTION

The aim of the invention is therefore to provide a rotary cutting tool and a machining method which overcome the aforementioned problems relating to the embodiments of the prior art.

To this end, the subject of the invention is a rotary cutting tool extending along a longitudinal axis and comprising a first cutting portion including a plurality of first helical teeth having a given helix direction and being designed to work in a first direction of rotation of the tool. According to the invention, the tool additionally includes a second cutting portion offset from the first along the longitudinal axis, this second cutting portion including a plurality of second helical teeth having, as helix direction, the given helix direction mentioned above, these second teeth being designed to work in a second direction of rotation of the tool, opposed to the first.

Thus, one of the special features of the present invention is that the cutting tool, preferably taking the form of a milling cutter, has two separate cutting portions, thereby allowing an overall reduction in the number of tool changes during the use of a machining method requiring a multitude of successive machining steps to be performed on one and the same workpiece to be machined.

It is indicated first of all that when the direction of relative feed between the cutting tool and the workpiece is imposed by the workpiece geometry, the fact of wishing to work with preference in climb mode imposes a direction of rotation of the tool to which the tool according to the invention can advantageously be adapted with ease. Specifically, when the new direction of rotation required is the same as in the preceding machining step, the operation is then of course continued with the cutting portion of the tool which has just been used, while in the opposite case where the new direction of rotation imposed is opposed to that used in the previous machining step, all that is then required is to employ the other cutting portion of the tool to ensure that working takes place in climb mode during this new machining step.

This specific feature therefore makes it possible to considerably limit the tool changes during a method of machining one and the same workpiece that incorporates a multitude of machining steps, that resulting directly in significant savings in terms of production times and costs.

Moreover, it is noted that in the other cases where the direction of relative feed between the cutting tool and the workpiece is not imposed and can thus be freely chosen by the operator, this free choice can be added to that of the direction of rotation of the tool offered by the tool according to the invention thanks to the twin presence of the two cutting portions. Thus, the operator advantageously has available two parameters of which he can freely fix the combination in such a way as not only to allow work to take place in climb mode but also to ensure that the overall cutting force generated during the machining step results in the workpiece being applied against the positioning rests conventionally provided on the machine, and not against clamping means which equip the machine and complement the positioning rests. As stated above, the advantage associated with obtaining an application of the workpiece against the positioning rests lies in the improvement in the retention of the workpiece during the machining, this advantage being manifested by increased cutting quality and precision.

Preferably, the given helix direction mentioned above is right-handed, this also being referred to as a "right-handed helix". However, a left-handed helix direction for the first and second helical cutting teeth could be provided as an alternative, without departing from the scope of the invention.

Preferably, the first direction of rotation of the tool associated with the first teeth is the clockwise direction in cross section as viewed from a sleeve of the tool toward the first cutting portion, this direction also being referred to as "right-cutting" direction. Moreover, the second direction of rotation of the tool associated with the second teeth is the counterclockwise direction in cross section as viewed from the sleeve toward the second cutting portion, this direction for its part also being referred to as "left-cutting" direction.

Preferably again, the first cutting portion is spaced apart from the second cutting portion along the longitudinal axis by a cylindrical intermediate portion of the tool, thereby facilitating its production.

Moreover, provision is preferably made for the first cutting portion to be closer to a sleeve of the tool than is the second cutting portion. Nevertheless, the converse arrangement is also contemplated, without departing from the scope of the invention.

Finally, the cutting tool according to the invention is preferably a milling tool, namely a milling cutter intended to allow milling operations during which the tool used is moved with a circular cutting movement about its own longitudinal axis, and the workpiece to be machined is moved with any desired relative feed movement with respect to this tool, such as a substantially rectilinear or circular movement, for example.

Moreover, another subject of the invention is a method of machining a workpiece using the rotary cutting tool which has just been set forth and which is mounted on a machine tool, the method comprising a first machining step using the first cutting portion of the tool and also a second machining step using the second cutting portion of the tool, these first and second machining steps being carried out successively while keeping the rotary cutting tool mounted on the machine tool. Therefore, the tool is advantageously not demounted from the machine tool between the two aforementioned machining steps, the only operation required between these two latter steps thus being a change of rotation of the tool.

Preferably, each of the first and second machining steps is implemented in such a way that the first and second cutting portions work in climb mode the material of the workpiece to be machined.

Preferably again, the first machining step is implemented in such a way as to obtain a first direction of relative feed between the cutting tool and the workpiece to be machined, and the second machining step is implemented in such a way as to obtain a second direction of relative feed between the cutting tool and the workpiece to be machined, opposed to the first direction.

As mentioned above, the first and second machining steps are preferably milling steps.

Other advantages and features of the invention will become apparent from the detailed nonlimiting description below.

BRIEF DESCRIPTION OF THE DRAWINGS

This description will be given with reference to the appended drawings, in which.

DESCRIPTION OF THE PREFERRED EMBODIMENTS

Figure 1:
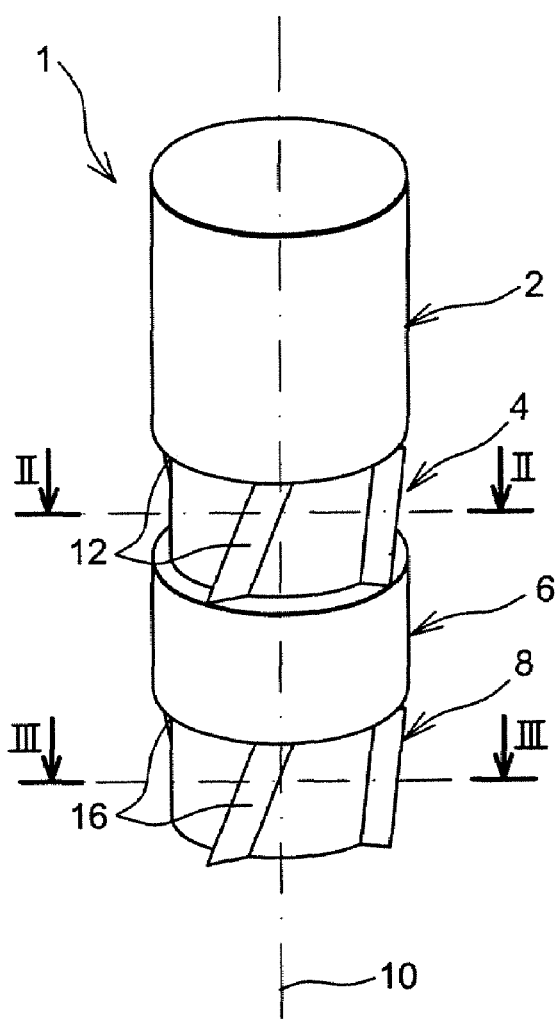
FIG. 1 represents a front view of a rotary cutting tool according to a preferred embodiment of the present invention.
Figure 2:
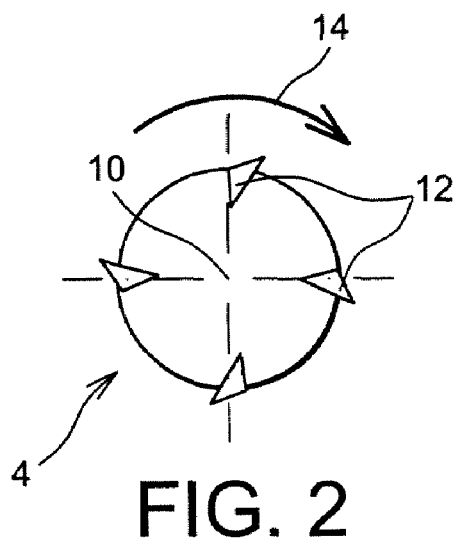
FIG. 2 represents a view in cross section taken along line II-II of FIG. 1.
Figure 3:
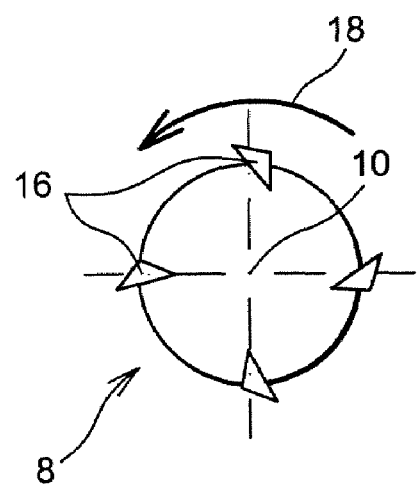
FIG. 3 represents a view in cross section taken along line III-III of FIG. 1.

With reference first of all to FIGS. 1 to 3, there can be seen a milling tool 1 according to a preferred embodiment of the present invention.

Overall, this tool 1 has, from top to bottom, a sleeve 2 designed for mounting this tool on a suitable machine tool (not shown), a first cutting portion 4, a cylindrical intermediate portion 6, and finally a second cutting portion 8. Of course, all these elements are arranged along a longitudinal axis of the tool, referenced 10 in the figures, which also corresponds to an axis of rotation of this tool.

The first cutting portion 4 is equipped with a plurality of helical cutting teeth 12, these teeth having a given helix direction, preferably chosen such that it is right-handed. By way of indication, it is recalled that a "right-handed helix" is such that in two successive cross sections of the first cutting portion 4, starting from the sleeve 2 toward the cutting end of the tool, the first teeth 12 are displaced in the clockwise direction. These first teeth 12 are designed to work in a first direction of rotation of the tool, which corresponds in cross section as shown in FIG. 2 to the clockwise direction, when this section is viewed from the sleeve 2 toward this first cutting portion 4. By way of indication, this clockwise direction is also referred to as "right-cutting" direction, and is represented schematically in this FIG. 2 by the arrow referenced 14.

On the other hand, the second cutting portion 8 for its part is equipped with second helical cutting teeth 16 provided with the same given helix direction, that is to say a right-handed helix, while having a second direction of rotation opposed to the above-indicated first direction 14. Specifically, this second direction of rotation, shown schematically in FIG. 3 by the arrow 18, is such that in cross section viewed from the sleeve toward this second cutting portion 8, it corresponds to the counterclockwise direction.

Figure 4:
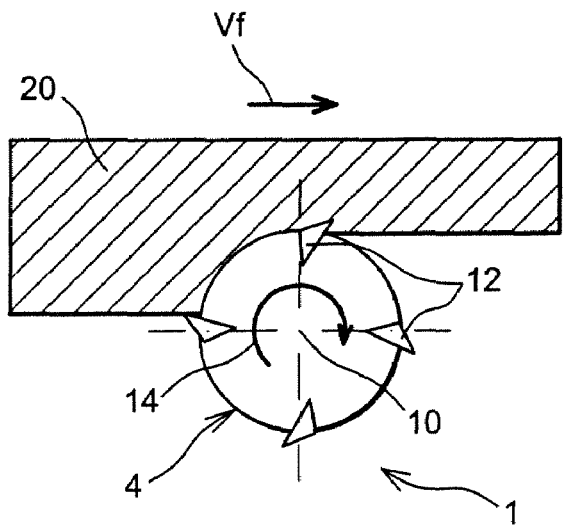
FIGS. 4 and 5 schematically illustrate two successive steps of a machining method according to a preferred embodiment of the invention, implemented using the tool shown in FIGS. 1 to 3.
Figure 5:
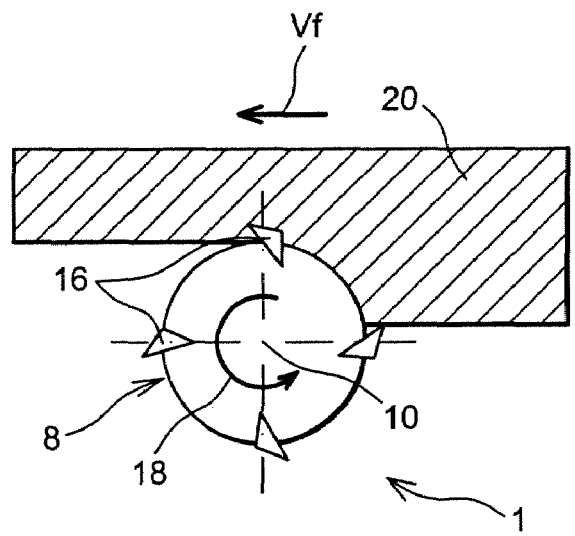

With reference now to FIGS. 4 and 5, these figures respectively schematically illustrate different steps of a machining method according to the present invention, this method being implemented using the tool 1 which has just been set forth.

FIG. 4 shows a first step for machining a workpiece 20, this first step being carried out using the first cutting portion 4, that is to say by causing the tool 1 to rotate in the clockwise direction 14. In order to work in climb mode, the direction of the relative feed Vf between the tool 1 and the workpiece 20 is fixed as shown in FIG. 4, that is to say by arranging for the workpiece 20 to move toward the right with respect to the tool 1 as viewed from above.

To conduct the second machining step shown schematically in FIG. 5, the tool is maintained in position on the machine tool (not shown), and this same tool is caused to rotate in a direction opposed to that employed during the first step schematically illustrated in FIG. 4. Therefore, this second step is implemented using the second cutting portion 8 rotating in the counterclockwise direction 18. Moreover, again in order to work in the preferred climb mode on account of the machining quality provided thereby, the direction of the relative feed Vf between the tool 1 and the workpiece 20 to be machined is then reversed with respect to that encountered during the first step, namely such that the workpiece 20 now moves toward the left with respect to the tool 1 as viewed from above, as is shown in FIG. 5. In this respect, it is indicated that this relative feed between these two elements can be obtained by setting either one of these two entities 1, 20 in motion, as is well known to a person skilled in the art.

Thus, as was indicated above, it can be seen that when the direction of the relative feed Vf is imposed by the geometry of the workpiece 20 to be machined, which geometry may moreover be relatively complex, all that is then required is to choose that cutting portion of the two which will make it possible, owing to the particular arrangement of the teeth which it incorporates, to work in the preferred climb mode. In this respect, as is well known to a person skilled in the art, it is recalled that the difference between the first helical teeth referred to as "right-cutting" teeth and the second helical teeth referred to as "left-cutting" teeth, these two sets of teeth moreover each being ones with a right-handed helix, lies quite simply in the orientation of the cutting edge of these teeth.

The advantage resulting from the implementation of the method which has just been described thus consists in not having to demount the tool 1 from the machine between the two successive machining steps.

Figure 6:
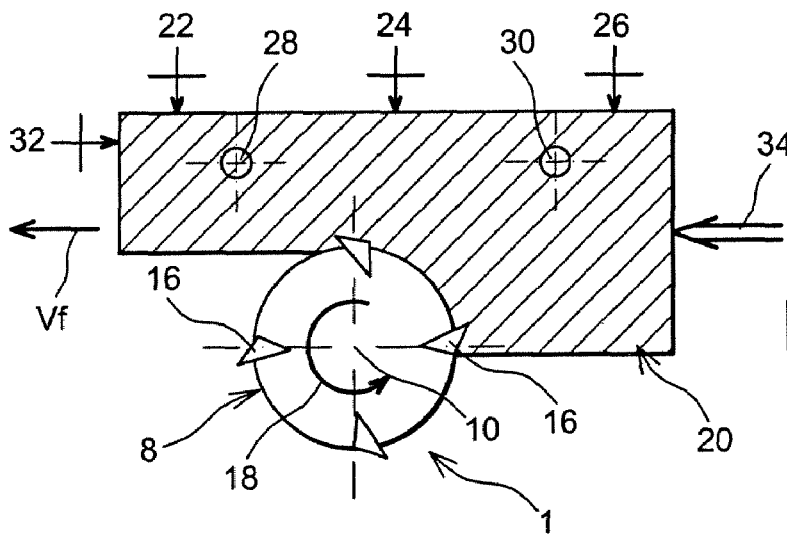
FIG. 6 schematically illustrates a machining step implemented during a method using the cutting tool shown in FIGS. 1 to 3.

With reference now to FIG. 6, this figure schematically illustrates the implementation of a machining step carried out while performing a different process. This FIG. 6 shows the isostatic mounting that allows the workpiece 20 that is to be machined to be fastened to the machine tool, this mounting comprising as a whole a planar rest consisting of the three fixed rests 22, 24, 26, a rectilinear linear rest consisting of the two fixed rests 28, 30, a point rest consisting of the fixed rest 32, and finally clamping means 34 that allow the workpiece to be fastened and are as a whole situated opposite the aforementioned fixed rests.

This FIG. 6 shows that the direction of the relative feed Vf and also the cutting portion of the tool 1 have been jointly chosen in such a way as not only to obtain working in climb mode but also as to obtain an overall cutting force, referenced by the arrow Fc in FIG. 6, directed toward the rests of the aforementioned isostatic mounting. That makes it possible as a whole to obtain an application of the workpiece 20 against these same positioning rests provided on the machine, and not against the clamping means 34. This then results in an improvement in the retention of the workpiece during the machining, which is manifested primarily by increased cutting quality and precision. By way of indication, it is noted that in the specific case represented in FIG. 6, it is the second cutting portion 8 which is used in such a way as to obtain left-cutting, that is to say so as to cause the tool 1 to rotate in the counterclockwise direction 18. On the other hand, the direction of the relative feed Vf between the tool 1 and the workpiece 20 to be machined has at the same time been chosen such that this same workpiece 20 moves toward the left with respect to the tool 1 as viewed from above, as is shown in FIG. 6.

Of course, various modifications may be made by a person skilled in the art to the invention which has just been described purely by way of nonlimiting examples.

The invention claimed is:

1. A rotary cutting tool extending along a longitudinal axis and comprising:
   a sleeve configured to mount said tool on a machine tool;
   a first cutting portion including a plurality of first helical teeth having a helix direction, each of said first helical teeth having a first cutting edge oriented so as to cut in a first direction of rotation of the tool;
   a second cutting portion offset from the first cutting portion along the longitudinal axis such that said first cutting portion is situated between said second cutting portion and said sleeve, said second cutting portion including a plurality of second helical teeth having said helix direction, such that said first and second helical teeth have a same helix direction, and, each of said second helical teeth having a second cutting edge oriented opposite the first cutting edge of said first helical teeth so as to cut in a second direction of rotation of the tool, said second direction of rotation being opposed to said first direction of rotation for said first helical teeth.

2. The cutting tool as claimed in claim 1, wherein said helix direction is right handed.

3. The cutting tool as claimed in claim 1 or 2, wherein said first direction of rotation of the tool associated with the first teeth is the clockwise direction in cross section as viewed from said sleeve toward said first cutting portion, and wherein said second direction of rotation of the tool associated with the second teeth is the counterclockwise direction in cross section as viewed from the sleeve toward said second cutting portion.

4. The cutting tool as claimed in claim 1, wherein said first cutting portion is spaced apart from the second cutting portion along the longitudinal axis by a cylindrical intermediate portion of the tool.

5. The cutting tool as claimed in claim 1, wherein said first cutting portion is closer to said sleeve than is said second cutting portion.

6. The cutting tool as claimed in claim 1, wherein said tool is a milling tool.

7. The cutting tool as claimed in claim 1, wherein said first and second helical teeth have a same helical angle with respect to said longitudinal axis.

8. The cutting tool as claimed in claim 1, wherein said first and second helical teeth are radially equidistant from said longitudinal axis.

9. The cutting tool as claimed in claim 1, wherein said sleeve is a cylindrical sleeve and said first and second helical teeth fit within a cylinder defined by said cylindrical sleeve.

10. The cutting tool as claimed in claim 1, wherein said helix direction is right handed, said first direction of rotation of the tool associated with the first teeth is clockwise and said second direction of rotation of the tool associated with the second teeth is counter-clockwise.

11. The cutting tool as claimed in claim 1, wherein each of said first helical teeth has a first non-cutting edge opposite said first cutting edge, said first non-cutting edge not being designed to cut in said second direction of rotation of the tool, and wherein each of said second helical teeth has a second non-cutting edge opposite said second cutting edge, said second non-cutting edge not being designed to cut in said first direction of rotation of the tool.

* * * * *